United States Patent [19]

Wu et al.

[11] Patent Number: 5,659,799

[45] Date of Patent: Aug. 19, 1997

[54] SYSTEM FOR CONTROLLING DISK DRIVE BY VARYING DISK ROTATION SPEED WHEN BUFFERED DATA IS ABOVE HIGH OR BELOW LOW THRESHOLD FOR PREDETERMINED DAMPING PERIOD

[75] Inventors: Cheng Wu; Dai-Wei Yeo; Siew-Kiat Leow, all of Singapore, Singapore

[73] Assignee: Creative Technology, Ltd., Singapore, Singapore

[21] Appl. No.: 554,368

[22] Filed: Nov. 8, 1995

Related U.S. Application Data

[63] Continuation-in-part of Ser. No. 542,342, Oct. 11, 1995.
[51] Int. Cl.[6] .................................................. G06F 13/00
[52] U.S. Cl. .................... 395/877; 395/821; 395/880; 369/100
[58] Field of Search .............................. 395/821, 250, 395/877, 872, 880; 369/47, 100; 364/236, 239, 270

[56] References Cited

U.S. PATENT DOCUMENTS

| 3,724,720 | 4/1973 | Bullivant ................................ 222/55 |
|---|---|---|
| 4,571,674 | 2/1986 | Hartung ................................. 395/25 |
| 4,860,193 | 8/1989 | Bentley et al. ......................... 395/250 |
| 4,931,924 | 6/1990 | Kageura ................................. 395/500 |
| 4,994,922 | 2/1991 | Goddard ............................... 358/31 C |
| 5,063,552 | 11/1991 | Shigemori ............................. 369/50 |
| 5,146,576 | 9/1992 | Beardsley et al. .................... 395/440 |
| 5,210,829 | 5/1993 | Bitner .................................... 395/250 |
| 5,212,798 | 5/1993 | Kanda ................................... 395/439 |
| 5,237,676 | 8/1993 | Arimilli et al. ....................... 395/550 |
| 5,280,587 | 1/1994 | Shimodaira et al. ................. 395/880 |
| 5,291,468 | 3/1994 | Carmon et al. ....................... 369/47 |
| 5,291,588 | 3/1994 | Kohtz et al. .......................... 395/550 |
| 5,301,351 | 4/1994 | Jippo .................................... 395/800 |
| 5,313,443 | 5/1994 | Iitsuka .................................. 369/50 |
| 5,363,361 | 11/1994 | Bakx ..................................... 369/54 |
| 5,408,678 | 4/1995 | Kato et al. ............................ 395/800 |
| 5,414,816 | 5/1995 | Oyadomari ........................... 395/880 |
| 5,426,736 | 6/1995 | Guineau, III ......................... 395/250 |
| 5,434,891 | 7/1995 | Mery et al. ........................... 375/377 |

*Primary Examiner*—Thomas C. Lee
*Assistant Examiner*—Ki S. Kim
*Attorney, Agent, or Firm*—Townsend and Townsend and Crew LLP

[57] ABSTRACT

A disk drive motor control system which dynamically varies the speed of the motor in accordance with the desired data transfer rate is provided. This is accomplished by monitoring the transfer rate and lowering the speed when the transfer rate decreases and then raising the speed when the transfer rate increases. Hysteresis is preferably built-in so that rapid oscillations between the two speeds do not occur.

14 Claims, 5 Drawing Sheets

SYSTEM FOR CONTROLLING DISK DRIVE BY VARYING DISK ROTATION SPEED WHEN BUFFERED DATA IS ABOVE HIGH OR BELOW LOW THRESHOLD FOR PREDETERMINED DAMPING PERIOD

CROSS REFERENCE TO RELATED APPLICATIONS

This application is a continuation-in-part of DISK DRIVE WITH DYNAMIC VARIABLE RATE DATA TRANSFER, Ser. No. 08/542,342, pending, filed on Oct. 11, 1995.

SOURCE CODE APPENDIX

A source code appendix for a preferred embodiment (©1995 Creative Labs Inc.) is filed herewith. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to disk drives, and in particular to CD-ROM drives and mechanisms for controlling the disk drive speed.

CD-ROMs are in use today for a variety of applications. CD-ROMs are disks which have data stored on them in a manner that can be detected by a laser beam in a read head. For instance, the disk could have microscopic dark and light circles indicating bits of data, with one being reflective, and the other being burned through to a non-reflective lower layer. CD-ROMs are read only, but their advantage is that they can store large amounts of data. Typically, they are used for storing audio data for use with stereo systems, or for storing large amounts of archival-type data, such as library books. In addition, they can store multi-media data, such as audio and digital data for use in multi-media platforms.

A typical multi-media platform would include a standard personal computer with a multi-media board, a video board or a sound board. This board will interface with a CD-ROM drive to provide retrieved data to the computer.

The CD-ROM drive itself consists of a motor for turning a spindle which supports the compact disk (CD) itself. A read head including the laser and detector moves back and forth over the disk to detect data at the desired area. Many CD-ROM drives today are multi-speed drives. Multiple speeds are needed because audio data being retrieved for playing over speakers is retrieved at a much slower rate than large volumes of textual or video data being transferred to a computer screen. Thus, many CD-ROM drives will detect the type of disk being inserted and switch the motor to a low speed for an audio disk and to a high speed for a data disk.

One disadvantage of such dual-speed drives compared to the standard audio drives is that the disk drive motor is more expensive since it must be able to stand up to the rigors of the higher speed application, even when used for only the low speed audio. If an inexpensive audio-type disk drive motor is used, the motor may wear out fairly quickly if used for high speed data transfers, such a motor could wear out in one to two years if used for such high speed applications.

In addition to using a more durable, more expensive motor, another solution for saving wear and tear on the motor is to turn the disk drive motor off when it is not being used. This is often used in a sleep mode in portable computers, for instance. In addition to saving wear and tear on the disk drive motor, this also will conserve power. Clearly, more power is required at high speed than at low speed, and more power at low speed than when the disk drive motor is turned off.

Many CD-ROM drives also include a DRAM data buffer for storing the data retrieved from the CD-ROM. This helps match the transfer rate between the CD-ROM and the computer, and also allows a way to even out the uneven transfer from the CD-ROM, which will occur, for instance, when it is in a search mode looking for the appropriate track, at which time no data will be transferred. When it locks on to a track, the data rate is very high. The buffer allows an averaging out of this data transfer rate and also allows time for the CD-ROM drive to perform error correction, rereading of erroneous detected data, etc., without affecting the rate transferred to the computer.

It would be desirable to have a CD-ROM disk drive motor system which can efficiently operate at two speeds with minimal power and minimal wear and tear on the motor.

SUMMARY OF THE INVENTION

The present invention provides a disk drive motor control system which dynamically varies the speed of the motor in accordance with the desired data transfer rate. This is accomplished by monitoring the transfer rate and lowering the speed when the transfer rate decreases and then raising the speed when the transfer rate increases. Hysteresis is preferably built-in so that rapid oscillations between the two speeds do not occur.

In a preferred embodiment, the disk drive is a CD-ROM drive with a built-in DRAM buffer. The data transfer rate is determined by monitoring the amount of data in the buffer. If the data in the buffer is very low, this indicates an increasing data transfer rate, and the disk drive speed is increased. If the buffer contents fill up so that it is very full, on the other hand, this indicates a slower data transfer rate, and the disk drive motor speed can be decreased. Alternately, rather than monitoring the buffer contents, the actual transfer rate of the data could be monitored, or the content of the data could be monitored to determine whether it is audio or other data. Numerous other alternatives are also available, such as having the computer provide a transfer rate signal to the CD-ROM drive.

In one embodiment, hysteresis is included by setting a high and low threshold in the data buffer. When the data buffer is empty or near-empty, the disk drive motor will operate at a high speed to fill up the buffer. As the amount of data passes the low threshold, the disk drive motor stays at the high speed, and remains there until the amount of data passes a high threshold. At that point, the disk drive motor is switched to a low speed. When the amount of data passes below the high threshold, there is not a switch to the high speed again, but rather the system waits until the disk drive motor passes the low threshold. In this manner, small fluctuations in data rate above and below a threshold which could otherwise cause the speed of the disk drive motor to oscillate and cause chattering is not allowed to occur.

In addition, a damping rate is also preferably used. This is used for disk drives which mostly use one type of disk data, such as audio data. This type of disk drive will operate at a low speed most of the time, and thus most times a transition to a high speed would be short-lived, and the altering of the disk drive speed would be more harmful than leaving it at the low speed for the short duration of the high demand data rate. This is implemented by requiring multiple requests from the monitoring firmware or software routine for a transition to the high speed before such a transition will be allowed. Thus, in addition to the hysteresis, this additional damping further limits rapid transition based on the average expected content of the CD-ROM.

It has been found that a CD-ROM drive control system according to the present invention can as much as double the life of a CD-ROM drive motor and can reduce power consumption by as much as half.

For a further description of objects and advantages of the invention, reference should be made to the ensuing detailed description taken in conjunction with the accompanying drawings.

DESCRIPTION OF THE PREFERRED EMBODIMENT

Figure 1:
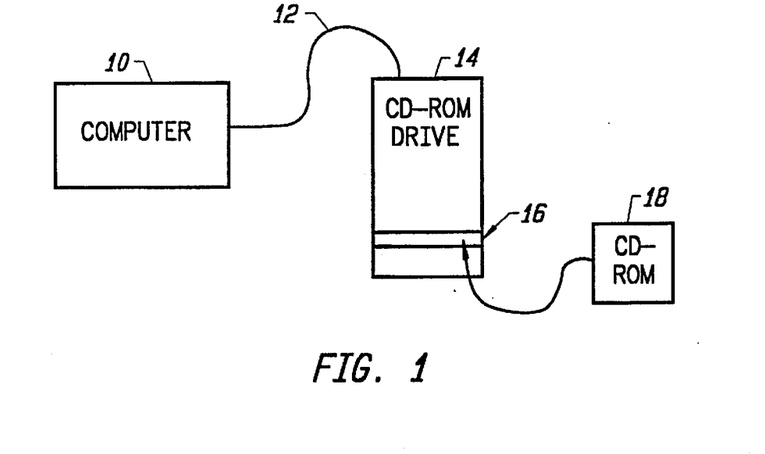
FIG. 1 is a diagram of a computer system using the present invention.

FIG. 1 shows a computer 10 connected via lines 12 to a CD-ROM drive 14. The CD-ROM drive has a slot 16 for receiving a CD-ROM disk 18.

Figure 2:
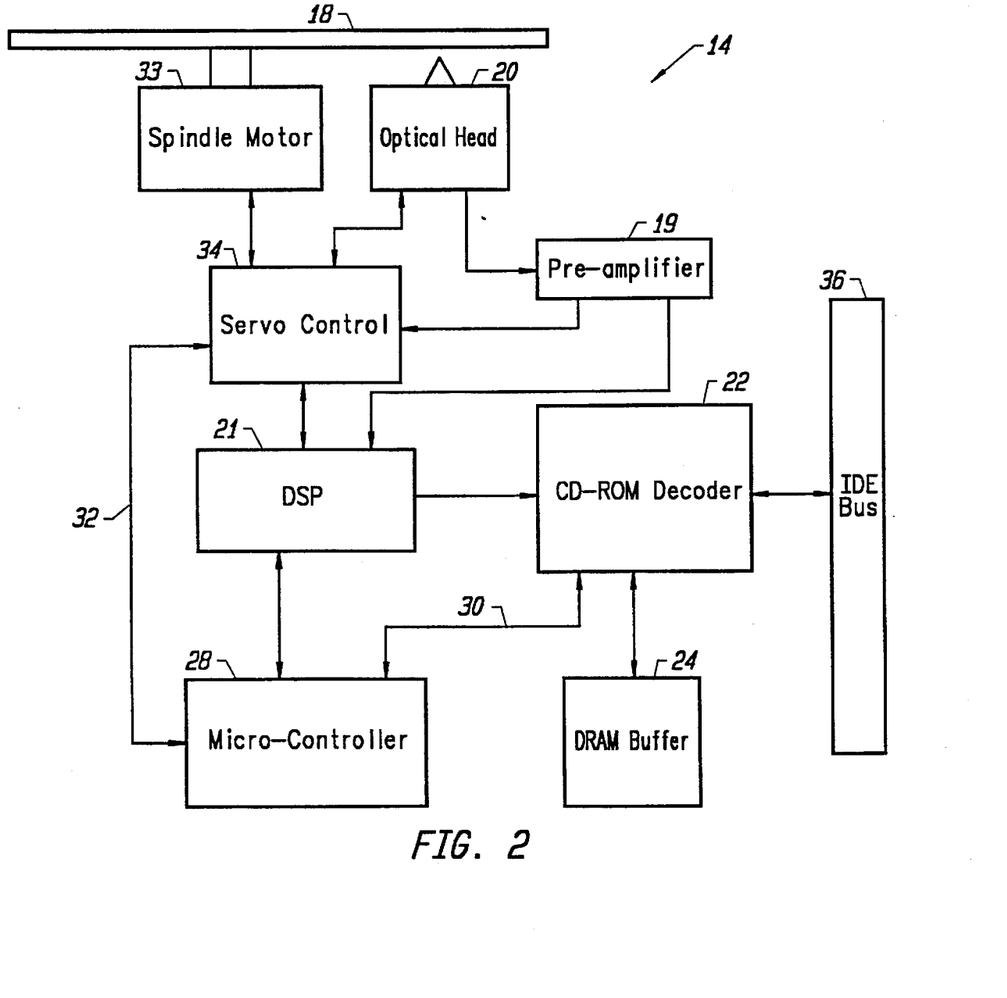
FIG. 2 is a block diagram of a CD-ROM drive controller using the present invention.

FIG. 2 is a block diagram of the electronics inside of CD-ROM drive 14. A CD optical head 20 includes the laser and detector for reflecting light off the CD 18 and reading it. The pulses are provided to a CD decode circuit 22 through a preamplifier 19 and a digital signal processor (DSP) 21. These devices convert detected data into the form of digital bits which can be provided to a DRAM buffer 24. Micro-controller 28 regulates the data rate transferred to the buffer, and prevents data from being transferred to the buffer when it is full. The micro-controller controls the reading and writing of the buffer and monitors the status of data in the buffer via control lines 30. In addition, via control lines 32 the CPU controls servo control circuit 34, which controls the speed of the CD-ROM drive spindle motor 33. The data from buffer 24 is provided to computer 10 through an integrated drive electronics (IDE) bus 36.

Figure 3:
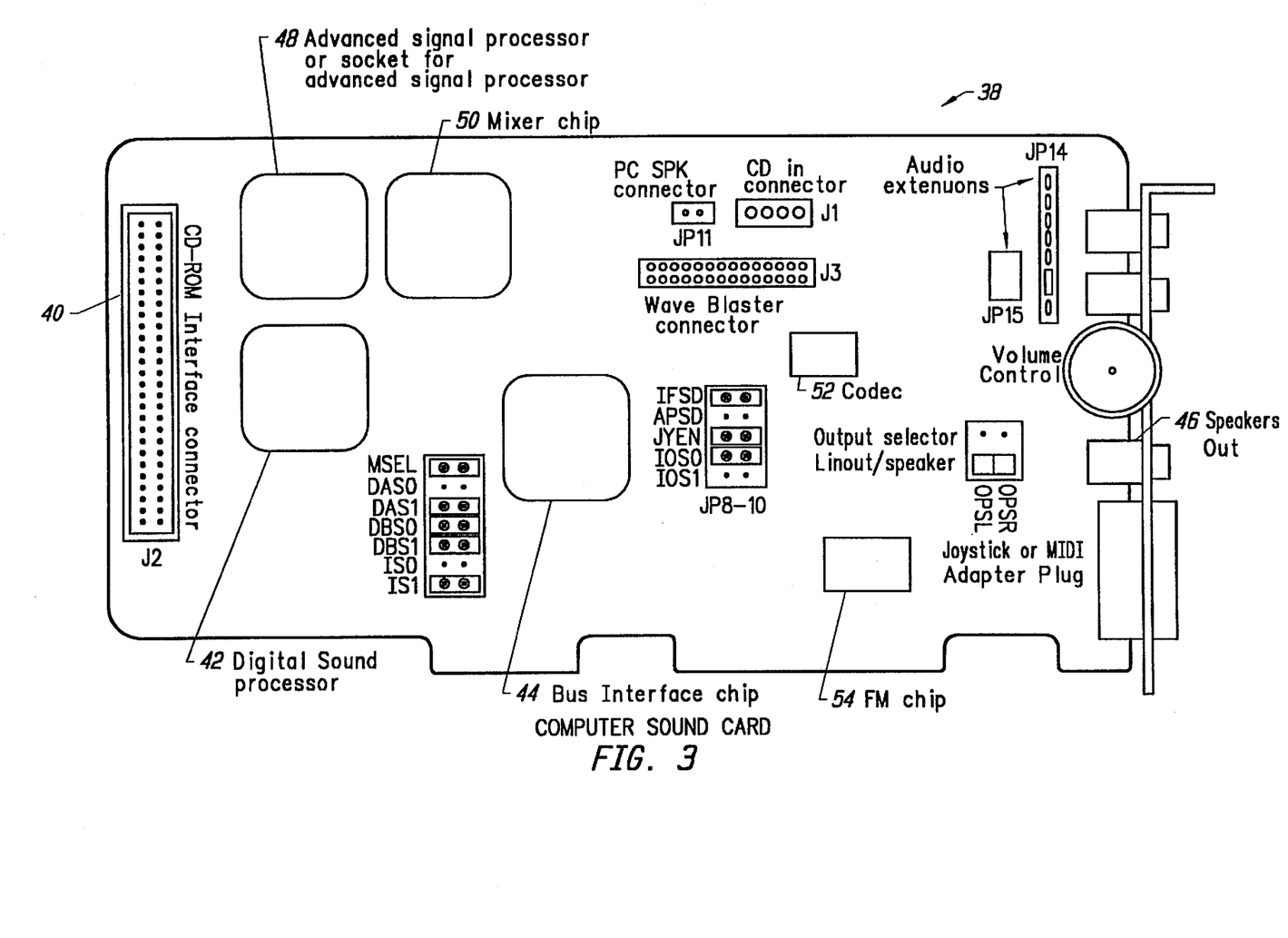
FIG. 3 is a block diagram of a prior art computer sound card which will interface with the CD-ROM drive of the present invention.

FIG. 3 shows a typical sound card 38 which may be installed in computer 10 for interfacing with CD-ROM 14. The sound card includes a CD-ROM interface connector 40. This is connected to a digital sound processor 42 which can compress the signals and provide them to various places, such as to the computer CPU through bus interface chip 44, or to speakers through a speaker connector 46.

Sound card 38 also contains an advance signal processor 48 for performing the manipulation of sound data, a mixer chip 50 for mixing sound from different sources, a code 52 for coding and decoding data for transmission, and an FM chip 54 for synthesizing sound data.

Figure 4:
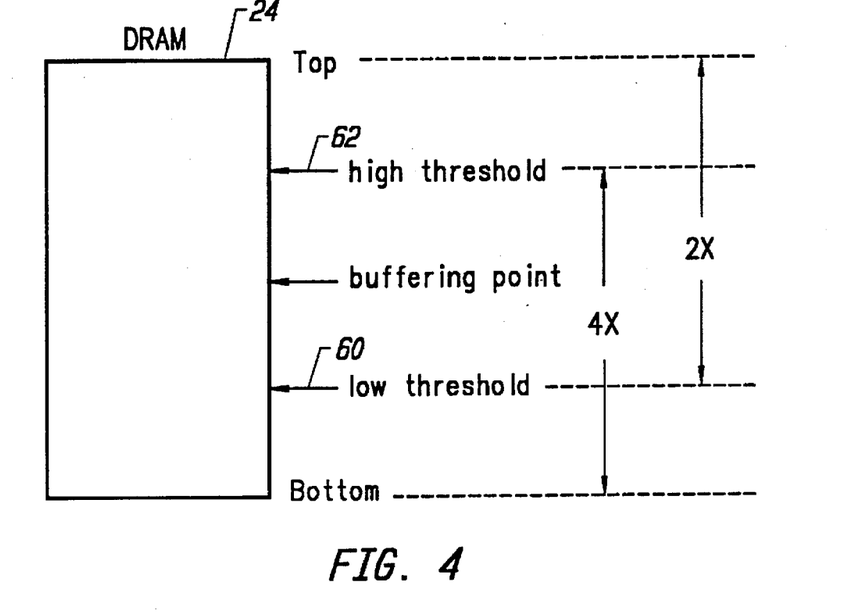
FIG. 4 is an illustrative diagram of a CD-ROM drive DRAM buffer with hysteresis.

FIG. 4 illustrates the DRAM buffer 24 of FIG. 2, showing in an illustrative manner the high and low data thresholds 60 and 62. In operation, when the amount of data in DRAM buffer 24 is below low threshold 60, the disk drive motor can be switched to high speed (i.e., four times data rate) to fill up the DRAM buffer. The fact that the DRAM buffer is almost empty indicates that the computer is drawing data out of the buffer faster than it is being filled. If the amount of data then increases above low threshold 60, the motor continues to operate at high speed. Only when the amount of data exceeds high threshold 62 will the motor be switched back to low speed. This indicates that the buffer is filling up faster than the data is being transferred to the computer, and thus there is no longer the need for the high speed data transfer.

In one embodiment, buffer 24 holds 96 blocks of memory, with the low threshold point 60 being 38 blocks, and with the high threshold point 62 being 58 blocks (each block is 2K). Thus, the low threshold is a little bit more than one-third and the high threshold a little bit less than two-thirds of the buffer contents. Other buffer sizes may be used, with 64K and 192K being exemplary sizes.

The amount of data in the DRAM is detected by monitoring pointers to the DRAM buffer. Being a random access buffer, data can be written at different points and read from different points, thus requiring multiple pointers to track where the good data begins and ends. Accordingly, a firmware or software routine can monitor the difference between the read pointer and write pointer to determine the amount of usable data in the DRAM buffer.

Alternately, the commands for reading the data could be monitored directly. Computer 10 will typically send a command to the CD-ROM drive requesting blocks of data, which are typically transmitted in blocks of 2K. The CPU can ask for any number of blocks. By decoding the command and determining the number of blocks requested, the transfer rate can be derived without monitoring the contents of the DRAM buffer. For example, if multiple commands are detected asking for only 2K each within a certain period of time, a low transfer rate is indicated and the CD-ROM drive motor can be set to the low speed appropriately. Conversely, if multiple commands requesting large numbers of blocks of data are detected, the CD-ROM drive motor can be set to a high speed. Hysteresis can still be imposed, although the method would be slightly different. Instead of monitoring that the buffer go above and below high and low thresholds, the rate of data requested will have to maintain at that low or high rate for a predetermined period of time or number of commands or blocks before a switch will be made to the other speed.

Multiple-Speed Drives

In another embodiment of the invention, rather than having simply a high and low speed, multiple speed drives could be used. Typically, present applications require speeds less than four times the data transfer rate for the disk drive. Thus, two times the transfer rate and four times the transfer rate could be the low and high speeds of the motor. Typically, these speeds are thus 1000 and 2000 RPMs. Alternately, multiple speeds could be supported, such as two times, three times, four times, five times, six times and eight times the data rate. Such embodiments could be imposed with multiple high and low thresholds.

Figure 5:
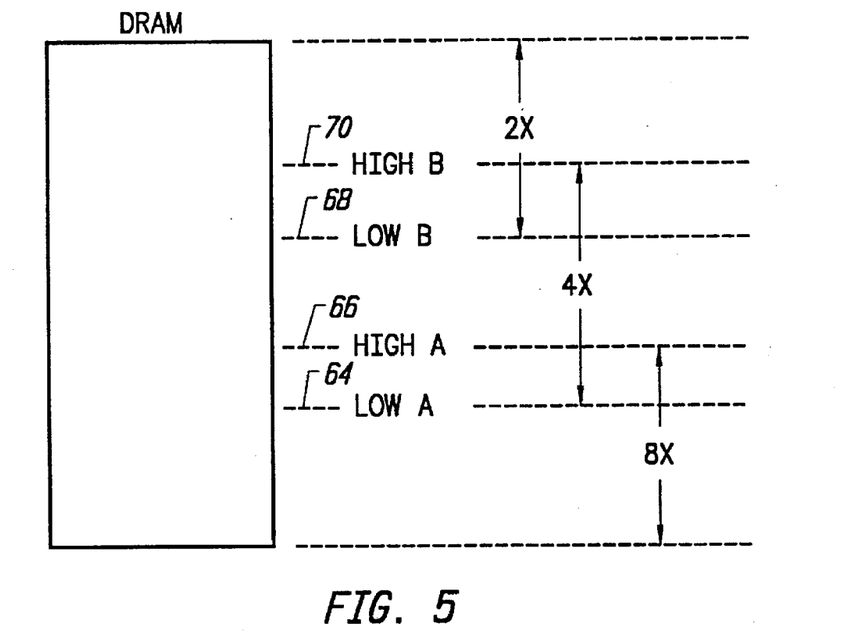
FIG. 5 is a diagram of a DRAM buffer for a three-speed embodiment of the present invention.

FIG. 5 illustrates one embodiment of a three-speed drive having two times, four times and eight times the data rate speeds. A low threshold A is shown at a point 64, with a high threshold A at a point 66. A second threshold is indicated by low threshold B at point 68 and high threshold B at point 70.

Threshold B governs the transition between two times and four times speed, while threshold A governs the transition between four times and eight times speed. The arrows in FIG. 5 illustrate the operating ranges of various speeds. As can be seen, the four times speed operation will increase above low threshold B until it reaches high threshold B, at which time the motor will be slowed down to two times speed since the DRAM buffer is almost full. If the amount of data in DRAM buffer starts to decrease, once it goes below low threshold B, the motor will shift into higher speed at four times the data rate. If the buffer continues to be drawn off due to the high data demands, once the buffer contents fall below low threshold A at point 64, eight times speed will be used.

Figure 6:
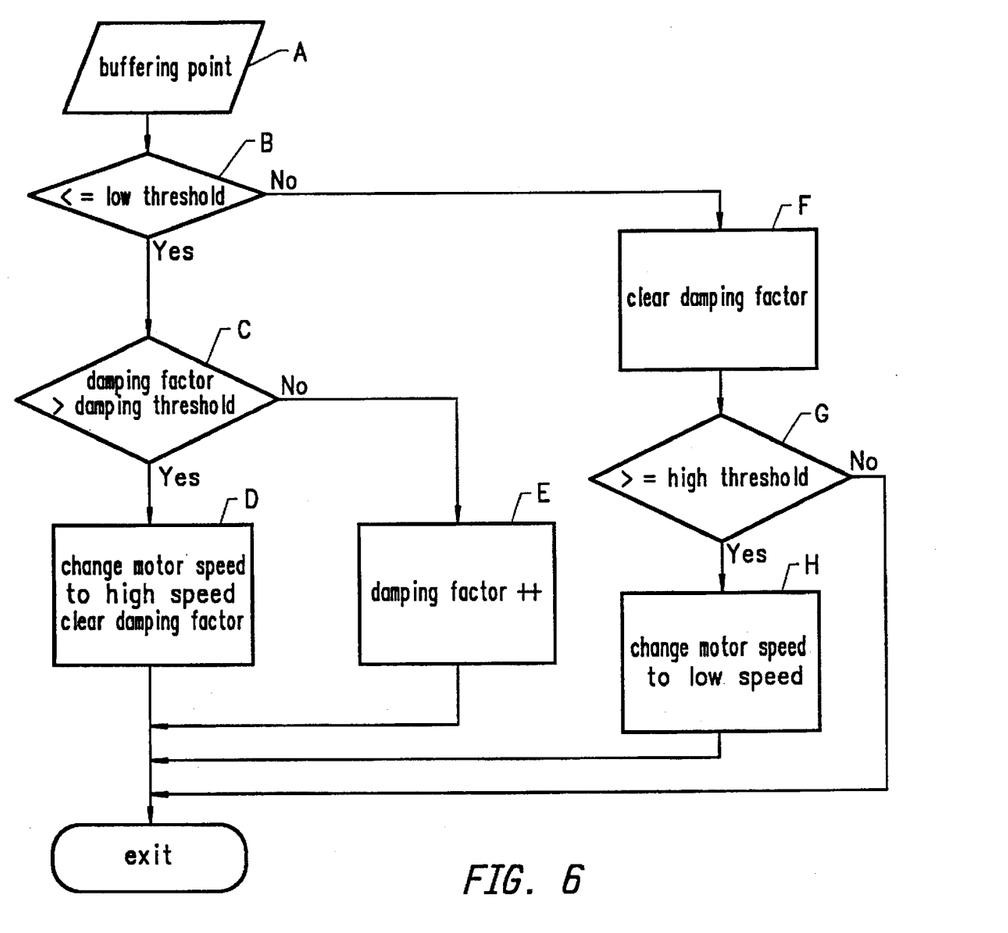
FIG. 6 is a flowchart illustrating the operation of the present invention for the embodiment set forth in FIG. 4.

FIG. 6 is a flowchart illustrating the operation of the present invention for the embodiment set forth in FIG. 4. At a first step A, the buffering point is determined, which is the amount of data in the DRAM buffer. This buffering point thus indicates whether the DRAM buffer is almost empty, almost full, or somewhere in the middle, such as indicated in FIG. 4. This buffering point is then compared to the low threshold in step B. If it is less than the low threshold, indicating the DRAM buffer is almost empty, the damping factor is checked in step C. If the damping threshold is exceeded, the motor is changed to high speed and the damping factor is cleared (step D). This thus illustrates the transition as the amount of data goes below low threshold 60 in FIG. 4.

The damping factor discussed in one embodiment is the number of times there has been a request to transition from low to high speed. Typically, the damping threshold can be a number stored in a register in the CD-ROM drive CPU 28 shown in FIG. 2. This register value might be initially set to five, for instance, thus requiring five requests before there will be a transition from low speed to high speed. The damping factor is initialized at zero, and compared to a damping threshold of five, for instance. If it is less than the threshold, the damping factor will be incremented (step E). The next time the damping factor is tested, after a low threshold test is successful in step B, step E will again be performed and the damping factor will be incremented again from one to two. Once the damping factor exceeds five, indicating five requests, the motor speed can be changed.

The purpose of a damping factor is that many CD-ROMs are primarily audio or other data that operates at a slow speed, and the CD-ROM will typically operate at the slower speed approximately 80% of the time. Thus, a transition to a high speed may be undesirable since it will quickly require a transition back to the low speed when the next group of low speed data is encountered. Accordingly, the damping factor is included to minimize these transitions for a short-lived, high speed data request.

As FIG. 6 shows, if the buffering point is above the low threshold, the damping factor will be cleared (step F). Thus, the amount of data in the buffer is in the middle of the buffer, and if it goes below the low threshold again, the multiple tries to exceed the damping threshold will again be required. If the high threshold is exceeded (step G) the motor is switched to low speed (step H).

The damping factor could be altered depending on a particular application. For instance, if a particular CD-ROM requires high speed transmission most of the time, the damping factor could be placed on the high threshold transition, rather than the low threshold transition. Alternately, the damping factor could be programmable and could be modified for various aspects of a program or various portions of CD-ROM.

The control mechanism of the invention can also be implemented at the device driver level. As computer applications always request data through the device driver, the device driver is in a position to determine what the actual demand is. In addition, with the ever increasing memory size of the computer system, it is possible to set aside a few mega-bytes of RAM or hard disk space as cache. With this large amount of cache, the traffic between the PC and the drive can be maintained at a constant lower speed although the application is demanding data in short bursts of much faster speed.

In one embodiment, a one-mega-byte RAM cache is used by the device driver. It is used to cache a contiguous block of data from the drive. When an application issues a read data request to the device driver, it will look into the cache. If it is a hit, data will be retrieved from the cache. The device driver will also keep statistics to check the application data demand rate. If it is higher than 600K/second over the last, say, 1 second, it will read the drive at 6X speed to fill up the buffer. Otherwise, it will read at 4X speed. There are at least two ways of controlling the speed of reading the drive. One is to issue a proprietary command to ask the drive to spin at the required speed. The second is to regulate the speed of reading so that the drive will settle at the correct speed by action of the algorithm in the drive firmware.

Figure 7:
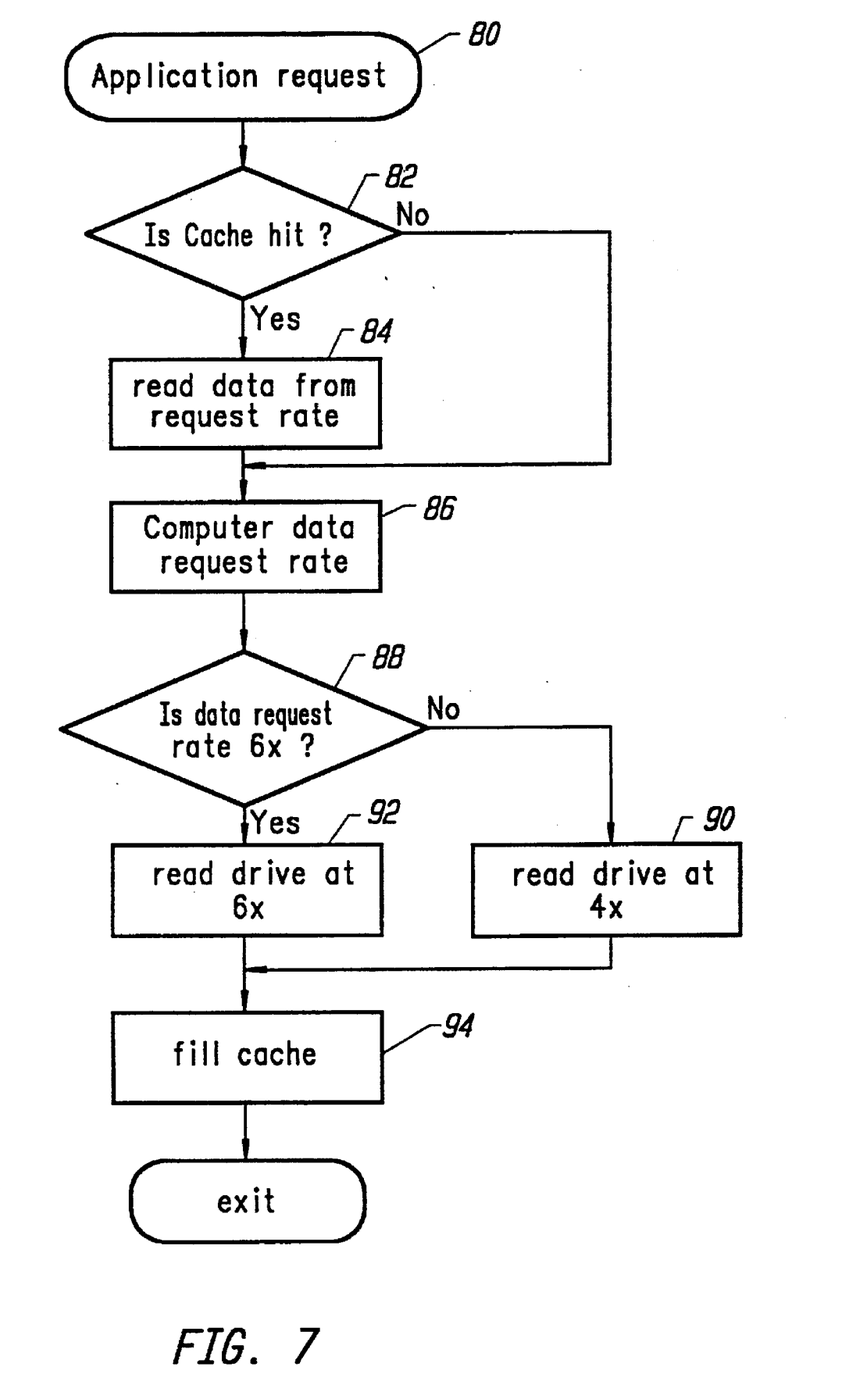
FIG. 7 is a flowchart of an embodiment using a device driver to control the drive speed.

FIG. 7 is a flowchart of an alternate embodiment of the invention in which the determination of the data rate required and control of the disk drive motor speed is done by a device driver in the computer. This embodiment uses a cache memory in the computer for a buffer, either instead of or in addition to a DRAM buffer in the disk drive itself. In operation, an application program will first request data (step 80). The cache memory is then checked to determine if the data is in the cache (step 82). If the data is in the cache, the data is read from the cache (step 84). If the data is not in the cache, or if the cache is emptied, a computer data request rate is determined (step 86). This request rate can be determined by either monitoring the data cache depletion rate, or monitoring the amount of data requested by the application program itself. Based upon this, a disk drive rate appropriate to accommodate the requested data rate is determined (step 88) and a control signal is sent to the disk drive instructing it to set the drive speed at its normal, 4X data rate (step 90) or to a faster 6X data rate (step 92). The data received is then used to refill the cache (step 94).

The attached Appendix is a source code listing suitable for implementing one embodiment of the invention, wherein three speeds are accommodated. The source code of the Appendix is in the assembly language of the well known "8051" family of microcontrollers and is preceded by a comment section setting forth a pseudocode description.

As will be understood by those of skill in the art, the present invention may be embodied in other specific forms without departing from the spirit or essential characteristics thereof. For example, the invention can be applied to other than CD-ROM drives, such as a CD-R drive. Multiple thresholds could be used and the damping factor may be placed in other areas of the program. The data rate detection could be performed in different ways, such as by monitoring the buffer contents or the commands or upon receipt of a control signal from the computer, etc. Accordingly, the foregoing embodiments are meant to be illustrative of the invention, and reference should be made to the appended claims for an understanding of the scope of the invention.

APPENDIX

```
;----------------------------------------------
;
;Module: chk_host_demand
;
;Description:
;
;Check host required data throughput to determine the speed to set.
;The basic implementation relics on buf_blkcnt to gauge how fast the
;buffer is drained out or fill up.
;
;Algorithm:
;       if(buf_blkcnt < BUF_SPEED_THRESH1)
;       {
;               ;speed = 6x
;               reset 4x demand count
;               if( 6x demand count >= 6x trigger)
;                   flag 6x demand
;               else
;                   increment 6x demand count
;               endif
;       }
;       else if(buf_blkcnt >= BUF_SPEED_THRESH2)
;       {
;               ;speed = 4x
;               reset 6x demand count
;               if( 4x demand count >= 4x trigger)
;                   flag 4x demand
;               else
;                   increment 4x demand count
;               endif
;       }
;       else
;       {
;               ;speed = 5x
;               reset 4x demand count
;               reset 6x demand count
;       }
;
;----------------------------------------------
chk_host_demand:
        clr     st_require_4x
        clr     st_require_6x
        jb      st_cdrom_audio,reset_counters   ;jif audio disc
        jnb     buf_valid,reset_counters        ;jif buf_blkcnt invalid
chk_blks_in_buffer:
        mov     a,buf_blkcnt
        subb    a,#BUF_SPEED_THRESH1
        jc      is_6x                           ;jif buf_blkcnt < BUF_SPEED_THRESH1
        mov     a,buf_blkcnt
        subb    a,#BUF_SPEED_THRESH2            ;jif buf_blkcnt >= BUF_SPEED_THRESH2
        jnc     is_4x
        mov     require_6x_cnt,#0               ;reset 6x demand counter
        mov     require_4x_cnt,#0               ;reset 4x demand counter
        jmp     reset_counters
is_4x:
        mov     require_6x_cnt,#0               ;reset 6x demand counter
        mov     a,require_4x_cnt                ;get no. of 4x demanded
        inc     a                               ;inc counter
        mov     require_4x_cnt,a
        cjne    a,#6,reset_counters             ;jif no. of 4x demand <limit yet
        mov     require_4x_cnt.#0               ;reset 4x demand counter
        setb    st_require_4x                   ;nth consecutive 4x demand
        jmp     reset_counters
is_6x:
        mov     require_4x_cnt,#0               ;reset 4x demand counter
        mov     a,require_6x_cnt                ;get no. of 6x demanded
        inc     a                               ;inc counter
        mov     require_6x_cnt,a
        cjne    a,#2,reset_counters             ;jif no. of 6x demand <limit yet
        mov     require_6x_cnt,#0               ;reset 4x demand counter
        sctb    st_require_6x                   ;nth consecutive 4x demand
reset_counters:
        mov     host_demanded_blks, #0          ;reset total blocks demanded counter
        mov     time_check_cnt, #0              ;reset time lapse counter
chk_host_demand_exit:
        rct
```

What is claimed is:

1. A disk drive comprising:

a variable speed motor for rotating a disk;

a read head for reading data from said disk;

a buffer coupled to said read head;

a data output port coupled to said buffer;

means for monitoring an amount of data buffered in said buffer; and a controller coupled to said means for monitoring and coupled to said variable speed motor, wherein said controller speeds up said variable speed motor when said mount of data is below a low threshold, and slows down said variable speed motor when said amount of data is above a high threshold, and wherein said controller is programmable to speed up said variable speed motor when said amount of data is below said low threshold for a first predetermined damping period, and slow down said variable speed motor when said mount of data is above a high threshold for a second predetermined damping period.

2. The disk drive of claim 1 wherein said disk drive is a CD-ROM drive and said disk is a CD-ROM.

3. The disk drive of claim 1 wherein said damping periods are measured in amounts of data.

4. The disk drive of claim 1 wherein said damping periods are measured in time.

5. The disk drive of claim 1 wherein said first damping period is programmable to be greater than said second damping period for a disk containing data which is transferred at a lower data rate for most of the time said disk drive is operating.

6. The disk drive of claim 1 wherein said controller includes a program loop requiring a predetermined damping factor, said damping factor being a required number of indications that said amount of data is above said high threshold, before increasing the speed of said motor.

7. The disk drive of claim 1 wherein said high threshold is between 55 and 70 percent of the capacity of said DRAM data buffer, and said low threshold is between 30 and 45 percent of said capacity.

8. The disk drive of claim 1 wherein the amount of data buffered in said buffer is monitored by monitoring a data transfer rate to and from said buffer.

9. The disk drive of claim 1 wherein said motor is a two speed motor.

10. A method for controlling a disk drive having a variable speed motor and a data buffer, comprising the steps of:

rotating a disk;

reading data from said disk into said buffer;

monitoring an amount of data buffered in said buffer;

speeding up said variable speed motor when said amount of data is below, a low threshold for a first predetermined damping period; and slowing down said variable speed motor when said amount of data is above a high threshold for a second predetermined damping period.

11. The method of claim 10 wherein said disk drive is a CD-ROM drive and said disk is a CD-ROM.

12. The disk drive of claim 10 wherein said damping periods are measured in amounts of data.

13. The disk drive of claim 10 wherein said damping periods are measured in time.

14. The method of claim 10 wherein said first damping period is programmable to be greater than said second damping period for a disk containing data which is transferred at a lower data rate for most of the time said disk drive is operating.

* * * * *